United States Patent Office 2,898,327
Patented Aug. 4, 1959

2,898,327

POLYMERIZATION OF OLEFINS

William John Gilbert McCulloch, Plainfield, and Arthur W. Langer, Jr., Nixon, N.J., assignors to Esso Research and Engineering Company, a corporation of Delaware No Drawing. Application April 18, 1956
Serial No. 578,891

5 Claims. (Cl. 260—88.1)

The present invention relates to the polymerization of olefins. More particularly, the invention pertains to the polymerization of olefins at relatively low pressures for the production of high molecular weight olefin polymers of improved properties and to the control of the polymer molecular weight within desirable limits.

In one of its aspects, the invention involves the polymerization of olefins, particularly ethylene to polymers, such as polyethylene of high molecular weight, at relatively low pressures in the presence of a reduced polyvalent metal compound as the catalyst, particularly in the presence of catalysts obtained by reacting a reducing metal-containing material with a reducible heavy metal compound and carrying out the polymerization reaction in the presence of acetylene in carefully controlled amounts.

Prior to the present invention it has been found that ethylene and other olefins may be polymerized at relatively low pressures not substantially exceeding atmospheric pressure when using various combinations of aluminum compounds, such as aluminum hydride, aluminum alkyls, e.g. trialkyls, alkyl aluminum halides, etc., with various reducible heavy metal compounds, such as the halides, acetyl acetonates, etc., of the metals of groups IV–VI and VIII of the periodic system, e.g. of titanium, zirconium and iron. Also pre-reduced heavy metal compounds of this type have been used in the absence of aluminum compounds or other reducing agents. Among the most active types of catalyst for this reaction are combinations of trialkyl aluminum or dialkyl aluminum halide with titanium tetrahalide. More specifically, excellent results have been obtained when using combinations of triethyl aluminum or diethyl aluminum chloride with titanium tetrachloride, obtained by simply mixing the catalyst components at atmospheric temperature in suitable solvents. These catalysts have been found to afford high yields of good quality, high molecular weight, solid high softening point polymers of ethylene and other olefins even at pressures as low as, or closely approaching, atmospheric pressure. For example, catalyst efficiencies up to 200 g., and more, of polymer per gram of catalyst have been attained with ethylene.

The molecular weight of the polymers so produced may fall within the wide range of from about 2,000 to 300,000 and as high as 3,000,000 and more as determined by the instrinsic viscosity method using the I. Harris correlation (J. Polymer Science 8, 361 (1952)). Specific molecular weights obtained depend on a multitude of process variables, many of which are interdependent, i.e. they cannot be changed without affecting other variables and other product characteristics, frequently in an undesirable manner.

For example, one known method of controlling polymer molecular weight in the reaction here involved is by adjusting the molar ratio of the aluminum compound or other reducing compound to the heavy metal compound in the catalyst mixture. Quite generally, the higher this ratio the higher is the polymer molecular weight within the broad range of 0.3 to 12 mols of reducing compound per mol of heavy metal compounds and for desirable molecular weights above about 20,000.

However, variations in this ratio also affect the activity of the catalyst, probably because of its influence on the degree of reduction of the heavy metal compound. Furthermore, low-pressure polyethylenes produced by this or other conventional methods in the relatively low molecular weight range of commercial, high-pressure polyethylene ($\approx$23,000) are brittle and difficult to process. In any case, it has been extremely difficult heretofore to obtain consistently satisfactory yields of flexible and readily processible polymers within an intermediate molecular weight range of, say, about 10,000 to 100,000, which is highly desirable for most uses of polymer "plastics" of the type of polyethylene.

The present invention overcomes, or at least greatly alleviates, this drawback and affords various other advantages as will appear from the subsequent description of the invention.

It has now been found that the addition of small concentrations of acetylene to the polymerization mixture results in a polymer product that is less crystalline and more flexible but yet of greatly increased tensile strength, as compared to conventional low-pressure polyethylene of comparable molecular weight, particularly within the range of 10,000 to 35,000. Moreover, these ethylene-acetylene copolymers have about twice the tensile strength of commercial high-pressure polyethylene. Processability is increased and the acetylene-containing product is superior to comparable low-pressure polyethylenes as film-forming material. The acetylene actually enters into the polymer structure. This is borne out by infra-red examination of the product in which, as the result of acetylene addition, Type II$t$ unsaturation is significantly increased, e.g. from $\sim$0.002 double bonds per 100 carbon atoms to $\sim$0.02 double bonds per 100 carbon atoms upon addition of $\sim$3400 parts per million parts (p.p.m.) of acetylene in the ethylene feed. This unsaturation may be used to further modify polymer properties by chemical modification at the active sites. In addition, molecular weight is kept within the desirable range of about 10,000 to 100,000.

The amount of acetylene to be used depends on the type of operation involved, i.e. whether batch or continuous operation; the length of the polymerization run in batch operation; the type and amount of catalyst, particularly its reducing component; the specific olefin monomer employed; etc. Quite generally, it may be stated that acetylene proportions from about 100 to about 10,000 p.p.m. of olefin feed result in appreciable improvements of polymer properties. Within this broad range of general applicability, which corresponds to approximately 0.1 to 10 mols of acetylene per mol of reducing metal component of the two-component type of polymerization catalyst, certain acetylene concentration levels are desirable in particular situations. For example, in the polymerization of ethylene with diethyl aluminum chloride-titanium tetrachloride catalyst composites in batch operation, acetylene concentrations of about 1,000 to 4,000 p.p.m. of ethylene feed may be used, with a range of about 2500 to 3500 p.p.m. being preferred. When using triethyl aluminum as the reducing component at Al/Ti=0.5, the catalyst is much more sensitive and lower acetylene concentrations of, say, about 200 to 1500 p.p.m. of ethylene feed may be used. When using 0.6–1/1 AlEt$_3$/TiCl$_4$ catalysts, acetylene concentrations as high as 10,000 p.p.m. of ethylene may be used, although molecular weights increase rapidly with increasing Al/Ti ratio. In general, acetylene contents below about 1,000 p.p.m. have relatively little effect on polymer properties whereas contents above about 10,000 p.p.m. are impractical because of the low catalyst activity resulting therefrom.

The acetylene added in accordance with the invention may be used in pure, concentrated or dilute form together with an inert gas such as nitrogen or ethane. The acetylene may be added to the polymerization mixture continuously or intermittently as a separate gas stream. However, addition of the acetylene to the olefin feed, which is usually in the gaseous state, is preferred. The same method of acetylene supply may be used when the feed olefin is predissolved in a normally liquid reaction diluent or solvent. Acetylene in the amounts here involved is readily soluble in solvents for ethylene and similar olefins.

In all other respects, catalyst composition and preparation as well as polymerization conditions may be those heretofore used in the specific art of low pressure olefin polymerization. Thus, a list of reducing catalyst components of outstanding utility includes the following aluminum compounds: tri-isobutyl aluminum, tripropyl aluminum and triethyl aluminum. Useful aluminum compounds of somewhat lower reducing activity include the following: dimethyl aluminum halides, trimethyl aluminum, higher dialkyl aluminum halides and trialkyl aluminum compounds having alkyl groups higher than about $C_{10}$. Mixtures of aluminum alkyls can also be used to reduce the heavy metal compounds. For example, mixtures containing ethyl aluminum dichloride and diethyl aluminum chloride have been successfully used to produce active catalysts in this manner. Similarly, mixtures of diethyl aluminum chloride and triethyl aluminum can be used. All these compounds as well as methods for their preparation are well known in the art. Quite generally, in addition to trialkyl or aryl aluminum compounds, organo-aluminum compounds carrying two hydrocarbon radicals or at least one hydrocarbon radical and one hydrogen, as well as an electron-attracting group, such as an alkoxy, halogen, organic nitrogen or sulfur radical, etc., may be used.

Other suitable reducing materials include the alkali and alkaline earth metals, their alloys, hydrides and their alkyl and/or aryl compounds, as well as quite generally the alkyl and aryl derivatives of other metals which have sufficient stability to permit reaction in their compound form with a reducible heavy metal compound.

Heavy metal compounds suitable for the purposes of the invention include such inorganic compounds as the halides, oxyhalides, complex halides, oxides, hydroxides, and organic compounds such as alcoholates, acetates, benzoates and acetyl acetonates of the transition metals of the IV, V, VI and VII periods of the periodic system, e.g. titanium, zirconium, hafnium, thorium, uranium, vanadium, niobium, tantalum, chromium, molybdenum, tungsten and manganese, as well as iron and copper. The metal halides, particularly the chlorides, are generally preferred, titanium and zirconium being the most active of these metals. The following heavy metal compounds are relatively readily reducible requiring only relatively low activating temperatures: titanium tetrabromide, titanium tetrachloride and zirconium acetylacetonate. The relatively difficultly reducible compounds include ferrous chloride, chromic chloride and manganese chloride. Also pre-reduced heavy metal compounds, such as $TiCl_3$ and/or $TiCl_2$ may be used as this catalyst component. Catalysts which are made by mixing metal alkyl with a reducible transition metal compound, as for example, gallium triethyl+zirconium acetyl acetonate or zinc diethyl+chromyl chloride may be used for the polymerization of olefins other than ethylene, such as propylene, dienes, etc.

Particularly striking results have been obtained by applying the present invention to ethylene polymerization carried out with catalysts prepared by reacting triethyl aluminum, diethyl aluminum chloride or mixtures of diethyl aluminum chloride with triethyl aluminum as the reducing agent with titanium tetrachloride as the heavy metal component. These catalysts may be pretreated at carefully controlled temperatures for about 5 to 20 minutes. The optimum pretreating temperature for a catalyst prepared from diethyl aluminum chloride and titanium tetrachloride lies between about 40° and 65° C. However, the beneficial effect of the acetylene added in accordance with the present invention is independent of this preconditioning treatment.

The catalysts are quite generally prepared by intimately mixing the aluminum compound or other reducing component and the heavy metal compound preferably in a solvent or diluent and in a non-oxidizing atmosphere while stirring. Paraffinic hydrocarbons, such as heptane or other saturated petroleum or synthetic hydrocarbon oils, are the most suitable solvents.

The molar ratio of the aluminum compound to the heavy metal compound in the catalyst mixture may vary widely. As pointed out above, the higher the polymer molecular weight desired the higher should be this ratio. A preferred molar ratio for alkyl aluminum compounds to titanium tetrachloride for making polymers above 20,000 molecular weight is about 0.5–6:1, molar ratios of 0.3–12:1, being suitable in many cases. If desired, control of this molar ratio may be used to counteract any undesirable molecular weight decrease caused by the acetylene addition of the invention. Thus, in order to maintain a given molecular weight while, at the same time, increasing the acetylene concentration, it may be desirable to increase the Al/Ti ratio.

The polymerization process in accordance with the invention is carried out at conditions normally used heretofore in the low pressure polymerization of olefins to prepare high molecular weight polymers suitable as "plastics" and for similar purposes. These conditions depend somewhat on the specific olefin involved and on the type of polymer desired. Ethylene is the preferred olefin although higher olefins, such as propylene, butylenes, etc., may be used alone or in mixtures. In the case of ethylene, the polymerization is carried out by intimately contacting gaseous ethylene with the catalyst of the invention, for example by bubbling the ethylene into a suspension of the catalyst in an inert solvent or diluent. Neither the polymerization temperature nor the polymerization pressure is particularly critical. It is preferred, however, to operate at temperatures of about 0° to 150° C., such as 25° to 90° C.

Pressures ranging anywhere from atmospheric or subatmospheric to 250 atmospheres have been used heretofore in the low pressure polymerization of ethylene and other olefins on catalysts of the type improved by the present invention. Similar pressures may be used for the process of the invention.

The reaction is preferably carried out under careful exclusion of oxygen while stirring in batch or continuous operation. When operating batchwise, olefin introduction is continued until the catalyst is exhausted and the reaction ceases. In order to permit stirring even after the formation of substantial amounts of solid polymer solvents or diluents may be used. These diluents which should be liquid at the operating conditions include aliphatic, hydroaromatic and aromatic hydrocarbons, such as pentane, hexane, higher paraffins, cyclohexane, tetrahydronaphthalene, decahydronaphthalene, benzene, xylene, halogenated aromatic hydrocarbons, e.g. mono- or dichlorobenzenes; ethers such as dibutyl ether, dioxane, tetrahydrofurane; and mixtures thereof. The polymer concentration in the reaction mixture may be about 10 to 40%.

The amount of catalyst used may vary within wide limits depending somewhat on the purity of the olefin feed. Proportions of as little as 0.1 part by weight of catalyst per 1,000 parts by weight of olefin are sufficient if the feed is pure. With olefin feed streams containing about 0.01% of water, oxygen, carbon dioxide or certain other oxygenated compounds, catalyst proportions of about 0.5 to 5 wt. percent are usually adequate.

Upon completion of the polymerization reaction, the catalyst is completely deactivated, e.g. by the addition of an alcohol, such as isopropyl alcohol or n-butyl alcohol in amounts of about 10 to 100 times the amount of catalyst used. The reaction slurry may then be filtered, the filter cake reslurried in a catalyst solvent, such as dry, concentrated alcohol at about 50° to 100° C. for 15 to 60 minutes, filtered again and the filter cake dried, preferably under reduced pressure. Ash residues in the polymer are reduced below about 0.05% by this procedure.

The polymers produced by the present invention are, in many respects, superior and in all other respectse at least equal to those produced by conventional low pressure polymerization processes, particularly at molecular weights below about 100,000. This and other more specific aspects of the invention will be best understood by reference to the following specific examples.

EXAMPLE I

Ethylene polymerization was carried out in several runs in a 2-liter glass reactor at atmospheric pressure using Matheson C.P. ethylene which was scrubbed through two scrubbers, containing 25% al(i-Bu)$_3$ in a high boiling white oil, to remove oxygen and water. Controlled amounts of acetyeene were added continuously to the ethylene after the scrubbers. Highly purified oxygen- and moisture-free normal heptane was used as reaction solvent and catalyst solvent.

In carrying out the reaction, 0.0044 gram mole of diethyl aluminum chloride dissolved in 900 ml. n-heptane was heated to 60° C. under exclusion of air and moisture and 0.0044 gram mole of TiCl$_4$ in 100 ml. of n-heptane was added during 1 minute with rapid stirring. Ethylene feed was started immediately at a rate of 1 liter per minute and was increased as required to maintain positive pressure in the reactor. All runs were carried out at 60° C. for 2 hours at atmospheric pressure after which the polymer was washed with dry isopropyl alcohol at 60° to 80° C., filtered and dried at 110° C. at less than 100 mm. pressure. When acetylene was used, it was passed through a Dry Ice trap to remove acetone, scrubbed through Al(i-Bu)$_3$ and then added to the ethylene stream prior to entering the reaction vessel.

One of the runs was a control run carried out in the absence of acetylene. The other four runs were carried out using varying amounts of acetylene. The acetylene concentrations, polymerization rates and product molecular weights of these runs are tabulated below.

*Table I*

| Run No. | Acetylene, p.p.m. in C$_2$H$_4$ AlEt$_2$Cl—TiCl$_4$ (Al/Ti=1) | Polymerization Rates, g. of Polymer/Hr. per g. Catalyst | per g. Al-Alkyl | Molecular Weight ×10$^{-3}$ |
|---|---|---|---|---|
| 1 | 0 | 41 | 107 | 74 |
| 2 | 550 | 39 | 101 | 61 |
| 3 | 2,400 | 28 | 72 | 38 |
| 4 | 3,000 | 18 | 46 | 26 |
| 5 | 3,400 | 10 | 26 | 16 |

EXAMPLE II

Three additional runs were carried out essentially as described in Example I except that 0.0022 gram mole of triethyl aluminum was used in place of 0.0044 gram mole of diethyl aluminum chloride, corresponding to an Al/Ti ratio of 0.5. The acetylene concentrations, polymerization rates and molecular weights are tabulated below.

*Table II*

| Run No. | Acetylene, p.p.m. in C$_2$H$_4$ AlEt$_2$Cl—TiCl$_4$ (Al/Ti=0.5) | Polymerization Rates, g. of Polymer/Hr. per g. Catalyst | per g. Al-Alkyl | Molecular Weight ×10$^{-3}$ |
|---|---|---|---|---|
| 6 | 0 | 90 | 403 | 93 |
| 7 | 200–700 | 67 | 300 | 57 |
| 8 | 1,000 | 35 | 157 | 36 |
| 9 | 8,600 (Al/Ti=1) | 19 | 49 | 350 |

EXAMPLE III

Two additional runs were carried out essentially as described in Example I except that chlorobenzene diluent was used in place of n-heptane. The polymers produced were evaluated for their physical properties together with the polymer from Run No. 4, Table I. The results are tabulated below.

*Table III*

| Run No. | 10 | 11 | 4 |
|---|---|---|---|
| Acetylene Content (p.p.m.) | 0 | 0 | 3,000 |
| Molecular Weight×10$^{-3}$ | 28 | 26 | 26 |
| Melt Index | 54 | 45 | 67 |
| Tensile Strength (p.s.i.) | [1] 1,265 | [1] 1,410 | 4,050 |
| Modulus of Rigidity (p.s.i.×10$^{-5}$)+25° C | Broke | 1.2 | 0.90 |

[1] Very brittle pads made it difficult to obtain strength and rigidity data.

The above data demonstrate that the addition of small amounts of acetylene in accordance with the invention results in a material of lower molecular weight and less rigid than that obtained when acetylene is omitted. This fact is substantiated by the lower modulus of rigidity in the material containing acetylene as compared to that without acetylene. It is further substantiated by the fact that pads molded from the straight polyethylene are so brittle that relatively poor tensile strengths are obtained whereas excellent tensile strengths are readily obtained from the material containing small amounts of acetylene. In other words, the acetylene-ethylene copolymer of the invention is more flexible, has superior molding properties and had 2 to 3 times the tensile strength of other low pressure polyethylenes of the same molecular weight. The 4,050 p.s.i. tensile strength of the 26,000 molecular weight ethylene-acetylene copolymer compares with about 1,900 p.s.i. for commercial high pressure polyethylene of about the same molecular weight. Therefore, in addition to its use for controlling molecular weight, acetylene imparts desirable properties to the product.

The invention is not limited to the specific figures of the foregoing examples. The relative proportions of the materials used and the reaction conditions may be varied within the limits indicated in the specification to obtain products of varying characteristics.

What is claimed is:

1. The process of copolymerizing ethylene with acetylene to obtain a copolymer of improved flexibility and tensile strength and having a molecular weight of 10,000 to 100,000 which comprises contacting the ethylene and acetylene at polymerization conditions with a catalyst system of a reducible titanium halide compound and an alkyl aluminum compound having at least 2 alkyl groups, the acetylene being utilized in an amount of from 1000 to 10,000 parts per million of ethylene feed.

2. The process of claim 1 in which said acetylene is added to said ethylene prior to said contacting.

3. The process of claim 1 in which said conditions comprise substantially atmospheric pressure and temperatures of about 0° to 150° C.

4. The process of claim 1 in which said alkyl aluminum compound comprises diethyl aluminum halide.

5. The process of claim 1 in which said reducing compound is triethyl aluminum.

References Cited in the file of this patent

UNITED STATES PATENTS

| | | | |
|---|---|---|---|
| 2,692,259 | Peters | Oct. 19, 1954 |
| 2,700,663 | Peters | Jan. 25, 1955 |
| 2,710,854 | Seelig | June 14, 1955 |
| 2,827,445 | Bartolomeo et al. | Mar. 18, 1958 |
| 2,827,447 | Nowlin et al. | Mar. 18, 1958 |

FOREIGN PATENTS

| | | |
|---|---|---|
| 533,362 | Belgium | May 16, 1955 |